A. J. MARSHALL.

Improvement in Propellers for Vessels.

No. 5,028. Reissued Aug. 6, 1872.

*Witnesses.*
Edwn James
R. V. Gordon.

*Inventor.*
Alexander J. Marshall.
per J. P. Holmeads
Attorney.

AM. PHOTO-LITHOGRAPHIC CO. N.Y. (OSBORNE'S PROCESS.)

UNITED STATES PATENT OFFICE.

ALEXANDER J. MARSHALL, OF WARRENTON, VIRGINIA.

IMPROVEMENT IN PROPELLERS FOR VESSELS.

Specification forming part of Letters Patent No. 112,366, dated March 7, 1871; antedated March 3, 1871; reissue No 5,028, dated August 6, 1872.

*To all whom it may concern:*

Be it known that Letters Patent of the United States, numbered 112,366, for Improvements in Propellers, were granted to me, ALEXANDER J. MARSHALL, of Warrenton, in the county of Fauquier and State of Virginia, on the 7th day of March, 1871; and that the following is a full, clear, and exact description of the same, reference being had to the accompanying drawing and the letters of reference marked thereon making part of this specification, in which—

Figure 1:
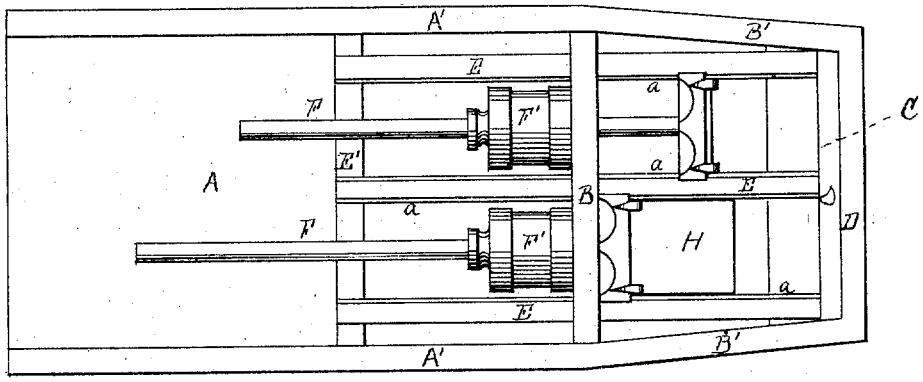
Figure 2:
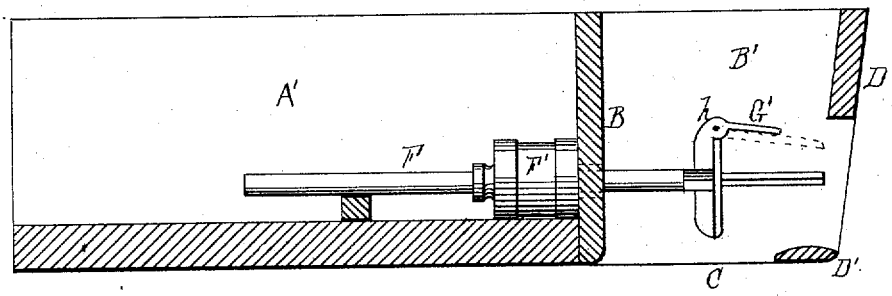
Figure 3:
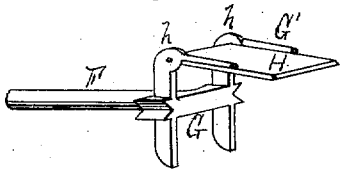

Figure 1 is a top plan view. Fig. 2 is a longitudinal vertical sectional view. Fig. 3 is a detached view, in perspective, of a piston, paddle, and the frame in which it is mounted.

The object of my present invention is to furnish a cheap, simple, and entirely feasible method of propelling canal-boats. The combination which constitutes my improvement is in its construction not only free from all complicated mechanism, and which is one cause of its great practicability, but the feature which chiefly recommends it is this: there is no waste power, as the entire force expended, as will hereafter be explained, is directly utilized in propelling the boat. I so construct the boat as to leave a recess-chamber at its rear. In combination with this chamber I use hinged paddles secured to piston-rods, so connected with a motor as to secure a reverse motion—or, in other words, such a movement that while one piston-rod and paddle are driven out longitudinally with the face of the paddle in a vertical position, the other is withdrawn with a feather-edge, or its blade in a horizontal position. This combination of chamber and paddles, so arranged as to operate as stated, embraces the features which constitute my invention.

The construction and operation of my invention are as follows: A is the hull of the vessel, and B the stem. Instead, however, of the sides A′ A′ of the hull rounding in at their rear sections and terminating at or forming a stem, B, they are extended beyond this point, so as to furnish close side walls B′ B′ for the chamber C. These side walls B′ B′ are square or rectangular in form, and parallel with each other, their flat under face or sections extending down to a point flush with the floor of the boat. These sides are simply designed to furnish a chamber, and not to provide guide-bearings for the paddles. For if the paddles or the frame to which they are attached filled the area of the chamber and thus prevented the influx of the current to fill the void at the bulk-head, caused by the movement of the boat, it would defeat the chief advantage of my invention. D D′ are cross plates or bars at the rear section of the boat, and serve to brace or strengthen the side walls B′ B′ of the chamber. Between these plates or bars D D′ is left an open unobstructed space, through which the water is driven by the action of the paddles. E E are three horizontal bars or plates that pass through the bulk-head B, and are secured to the cross-piece E′ and on suitable vertical supports in front, thus forming within the chamber C an independent framework, in which the paddles work. On the two sides of the center horizontal bar E and on the inner face of each of the side bars are guide-rails *a a*, over which fit and travel the forked heads of the cross-arms of the frame, to which the hinged paddles are attached. F F are two piston-rods, and F′ F′ are two steam-cylinders of ordinary construction. These cylinders are arranged on the floor of the boat, as near to the bulk-head B as possible to avoid a waste of space. In this bulk-head are two openings, through which pass and in which work the piston-rods F F. To the outer heads of these piston-rods are attached H-shaped bearing-plates G, the form and arrangement of which are clearly illustrated in Fig. 3. To the ears *h h* of this frame G are pivoted, so as to secure a hinge-joint connection, the paddle-blades H H. G′ G′ are two stop-arms, and project out from the ears *h h*, and serve to prevent the paddle-blades being raised beyond a given angle. The cross-arm of the bearing-plate G is forked at each end, which, fitting in and traveling over the guide-rails *a a* of the horizontal plate and bars E E, insures a proper and direct movement of the paddles. These paddles H H, it will be seen, are hinged to a frame, G, at their upper sections, and the frame and paddles are to be of such dimensions that under no circumstances will they fill the open mouth of the chamber, and consequently as these paddles are submerged and travel on independent guides E E, and not the sides of the chamber, an unobstructed channel above and around the paddles is afforded for the influx of water to supply the void created by the onward progress of the boat at the bulk-head B. The mechanism herein described is designed to be worked by any suitable engine, the piston-rods being so connected therewith as to insure an alternate or reverse movement.

The operation of my invention is as follows: The boat being constructed with a rear chamber, C, and the mechanism arranged therein as stated, is ready for use. The bottom and rear chamber being open, as clearly shown in Fig. 2, causes the chamber C always to be filled with a certain depth of water, the degree of depth depending on the draft of the boat, which in turn is regulated by the amount of freight or other weight with which she may be loaded. Practical experience has fully demonstrated the fact that the submerged reciprocating paddles when thus arranged, so as to operate within a chamber open at the bottom and rear, are most admirably adapted to produce the desired result. The position of the paddles on both their outward and return movement is clearly illustrated in Figs. 2 and 3. In Fig. 2 the paddle is driven out so as to exert its full propulsive force, and consequently its blade is in a vertical position, resting against and being supported by the frame G. So soon as it has been driven the full length of the stroke of the piston-rod it returns, the other paddle at the same instant being driven out. As the paddle is drawn in by the piston-rod it is elevated, as is illustrated in Fig. 3, and retains this feather-edge position until it is required to make its next outward stroke, when it falls to the desired vertical position by the combined action of the piston-rod and current. It will be seen that as the paddle returns its feather-edge cuts the water, offering little or no resistance to the advance of the boat. It will also be readily understood how, with this construction and arrangement of the chamber C, that the temporary void caused in the wake of the paddle as it is driven out is immediately filled.

What I claim as new, and desire to secure by Letters Patent of the United States, is—

1. The chamber C, frame-bars E E, plungers F F, and hinged paddles H H, the whole being so constructed and arranged that while the paddles shall operate within the chamber an unobstructed passage of the influx of the current above and around shall be left, substantially as described, as and for the purpose specified.

2. The paddle H formed and hinged to the frame G, as shown, stop arms H′ H′, and grooves *a a*, the whole being constructed and arranged so as to operate substantially as described.

In testimony whereof I have signed my name to this specification before two subscribing witnesses.

A. J. MARSHALL.

Witnesses:
EDWIN JAMES,
WM. C. HARPER.